US007367588B2

(12) United States Patent
Yamada

(10) Patent No.: US 7,367,588 B2
(45) Date of Patent: May 6, 2008

(54) STEERING COLUMN DEVICE

(75) Inventor: Jun Yamada, Maebashi (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 380 days.

(21) Appl. No.: 11/136,102

(22) Filed: May 24, 2005

(65) Prior Publication Data
US 2005/0269812 A1 Dec. 8, 2005

(30) Foreign Application Priority Data

| Jun. 4, 2004 | (JP) | ............................. 2004-166990 |
| Mar. 30, 2005 | (JP) | ............................. 2005-099918 |

(51) Int. Cl.
*B62D 1/19* (2006.01)
(52) U.S. Cl. ...................... 280/777; 74/492; 188/371
(58) Field of Classification Search ................ 280/777, 280/775, 779; 74/492, 493; 188/371, 377, 188/376; 248/548; 403/2
See application file for complete search history.

(56) References Cited

U.S. PATENT DOCUMENTS

| 3,373,965 | A | 3/1968 | Bien et al. .................. 248/226 |
| 4,884,778 | A | 12/1989 | Yamamoto ................... 248/548 |
| 4,943,028 | A | 7/1990 | Hoffmann et al. ........... 248/548 |
| 5,577,854 | A * | 11/1996 | Jacob et al. .................... 403/2 |
| 5,899,116 | A | 5/1999 | Armstrong et al. ........... 74/492 |
| 5,979,860 | A | 11/1999 | Jurik et al. .................. 248/548 |
| 6,062,100 | A | 5/2000 | Sarsfield et al. .............. 74/492 |
| 6,176,151 | B1 | 1/2001 | Cymbal ....................... 74/492 |
| 6,474,690 | B1 * | 11/2002 | Marxer et al. ............... 280/777 |
| 6,530,600 | B1 | 3/2003 | Marxer et al. ............... 280/777 |
| 7,178,834 | B2 * | 2/2007 | Li et al. ...................... 280/777 |

FOREIGN PATENT DOCUMENTS

| DE | 37 20 320 A1 | 12/1988 |
| JP | 8-301127 A | 11/1996 |
| WO | WO 99/61297 A1 | 12/1999 |
| WO | 2000-335430 A | 12/2000 |

OTHER PUBLICATIONS

EP Communication transmitting "Partial European Search Report", dated Jul. 12, 2005, for counterpart European Patent Application No. EP 05 01 1915.

\* cited by examiner

*Primary Examiner*—Ruth Ilan
*Assistant Examiner*—Drew J. Brown
(74) *Attorney, Agent, or Firm*—Sidley Austin LLP

(57) ABSTRACT

A steering column device comprises a bracket of the column body having mounting flanges with a cut-away groove opening in the backward direction of car body, a collar having a flange part and a cylindrical part, an elastically deformable ring which the cylindrical part of the collar can be inserted in, and a bolt for compressing the ring, putting the mounting flange of the column body between the ring and the flange part, thereby the steering column is mounted on the car body but allowed to be detached from the car body in the secondary collision.

10 Claims, 17 Drawing Sheets

STEERING COLUMN DEVICE

This application is based on application No. 2004-166990 and No. 2005-099918 filed in Japan, the contents of which are hereby incorporated by reference.

FIELD OF THE INVENTION

The present invention relates to a steering column device and particularly to a steering column device and a mounting device for mounting a moving member to separate a steering column, in occurrence of the secondary collision, from a body to the forward side thereof together with a steering shaft.

BACKGROUND OF THE INVENTION

In view of reducing the shock which a driver receives when an automobile collides with the other automobile and thereby the driver runs into a steering wheel as the secondary collision due to the inertia, a steering column device has been proposed, in which the steering column is separated from the body together with the steering shaft, if the driver dashed against the steering wheel in the form of the secondary collision.

In such steering column device, a body mounting bracket integrated with the steering column is fixed to a body via a capsule made of an aluminum alloy or the like in the structure that the body mounting bracket is removed from the capsule with a shock load by the secondary collision.

To this body mounting bracket, an almost U-shape cut-away groove is formed with the body backward side thereof opened. The internal surface of this cut-away groove is external engaged with a concave groove formed in the external surface of the capsule. Moreover, a resin pin is formed, with the injection molding process, to the through-holes formed to the capsule and body mounting bracket. Accordingly, a separating load is generated and the body mounting bracket (namely, steering column) can be removed from the capsule integrated with the body by shearing off this resin pin when the secondary collision occurs (JP-A No. 301127/1996).

However, the capsule of the conventional steering column device explained above is coupled with the body mounting bracket with the resin pin, resulting in the problem that not only the coupling rigidity of the body mounting bracket to the body, particularly rigidity to vibration becomes insufficient but also it becomes troublesome to attain sufficient conductivity between the body mounting bracket and the body.

SUMMARY OF THE INVENTION

An object of the present invention is to provide a steering column device which assures larger coupling rigidity between a body mounting bracket and the body side, is surely capable of attaining the electrical power feeding path, and is easily mounting the body mounting bracket to the body and also to provide a device for mounting a moving member to be removable.

The problem explained above can be solved with a means described below. Namely, the first invention is a steering column device, characterized by comprising: a steering shaft for a steering wheel being attached at the end, a column body for rotatably supporting the steering shaft, a bracket of the column body having mounting flanges with a cut-away groove opening in the backward direction of car body, a collar having a flange part with outer diameter larger than the width of the cut-away groove and a cylindrical part with outer diameter smaller than the width of the cut-away groove, an elastically deformable ring with outer diameter larger than the width of the cut-away groove and inner diameter which the cylindrical part of the collar can be inserted in, and a bolt for compressing the ring, putting the mounting flange of the column body between the ring and the flange part, so that the column body is mounted on the car body but allowed to be detached from the car body in the secondary collision.

The second invention is a steering column device of the first invention, characterized in that the ring is bent so that the outer edge of the ring is opposite to the mounting flange.

The third invention is a steering column device of the first invention, characterized in that the ring is provided with plural slits extending in the radial directions.

The fourth invention is a steering column device of the first invention, characterized in that the collar is made of electro-conductive material.

The fifth invention is a steering column device of the first invention, characterized in that a cylindrical bush is inserted between the cylindrical part of the collar and the cut-away groove.

The sixth invention is a steering column device of the first invention, characterized in that the ring has plural pawls extending inwardly from inner circumference of the ring and engaging with the cylindrical part when the cylindrical part is inserted into the ring to couple the ring and the collar.

The seventh invention is a steering column device of the fifth invention, characterized in that the bush has a bush flange with outer diameter larger than inner diameter of the ring and a through-hole for the cylindrical part to be forced into.

The eighth invention is a steering column device of the fifth invention, characterized in that the bush has an extension part with contact surface extending over the ring and projecting toward car body.

The ninth invention is a steering column device of the eighth invention, characterized in that the extension part is extending in the backward direction of car body.

The tenth invention is a steering column device of the eighth invention, characterized in that amount of projection of the extension part is larger than the thickness of the ring.

The eleventh invention is a yieldable mounting device for a car, characterized by comprising a member to be mounted having a mounting flange with a cut-away groove opening in the backward direction of car body, a collar having a flange part with outer diameter larger than the width of said cut-away groove and a cylindrical part with outer diameter smaller than the width of said cut-away groove, an elastically deformable ring with outer diameter larger than the width of said cut-away groove and inner diameter which said cylindrical part of said collar can be inserted in, and a bolt for compressing said ring, putting said mounting flange of said member between said ring and said flange part, so that said member is mounted on said car body but allowed to be detached from said car body in the secondary collision.

In the steering column device of the present invention, since the body mounting bracket can be mounted to the body utilizing elastic deformation of an elastic deformable part of the ring, even if heights of flange, ring and collar have errors, such errors are absorbed and thereby the body mounting bracket can be rigidly mounted to the body with a constant removing load. Moreover, since the resin pin is not used, high vibration rigidity can be ensured and the power feeding path can surely be attained.

DETAILED DESCRIPTION OF THE PREFERRED EMBODIMENTS

Figure 1:
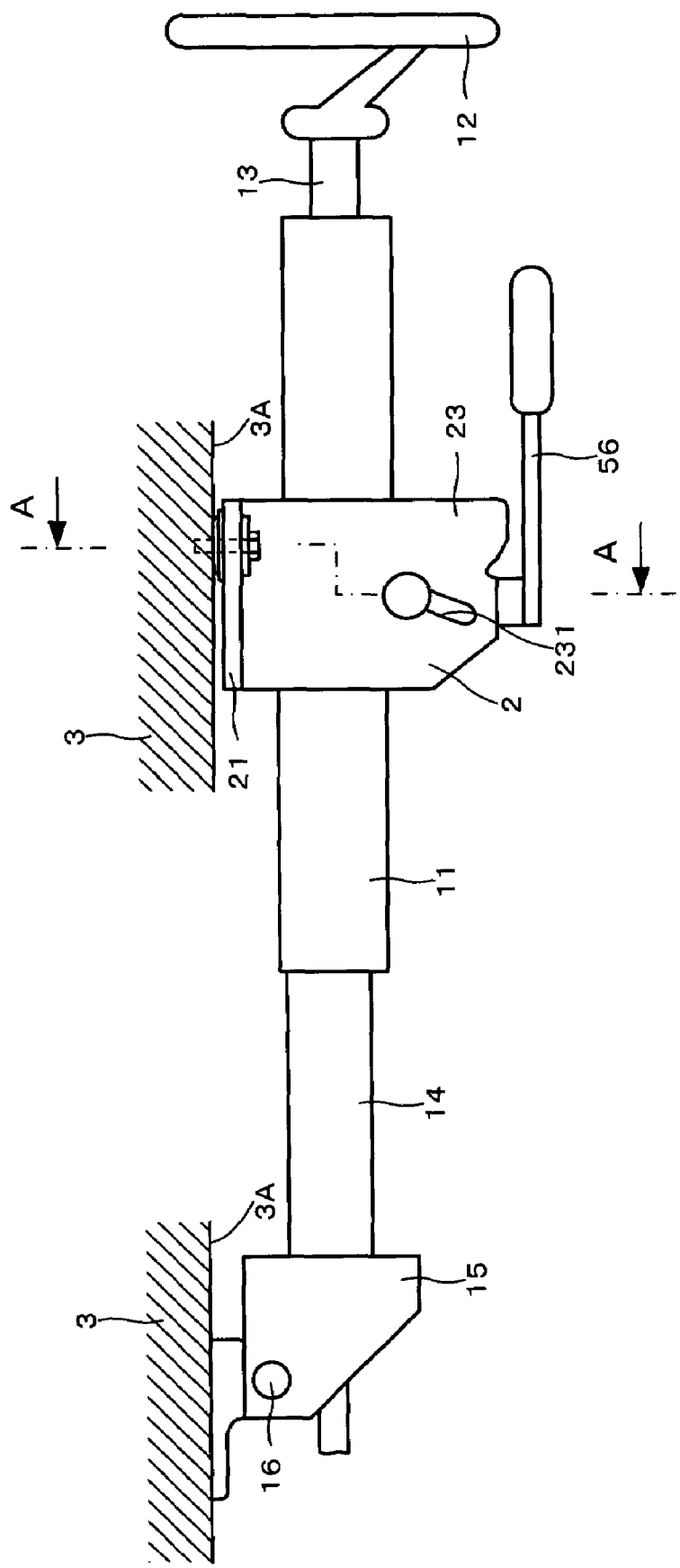
FIG. 1 is a total side elevation of a steering column device of the present invention.
Figure 2:
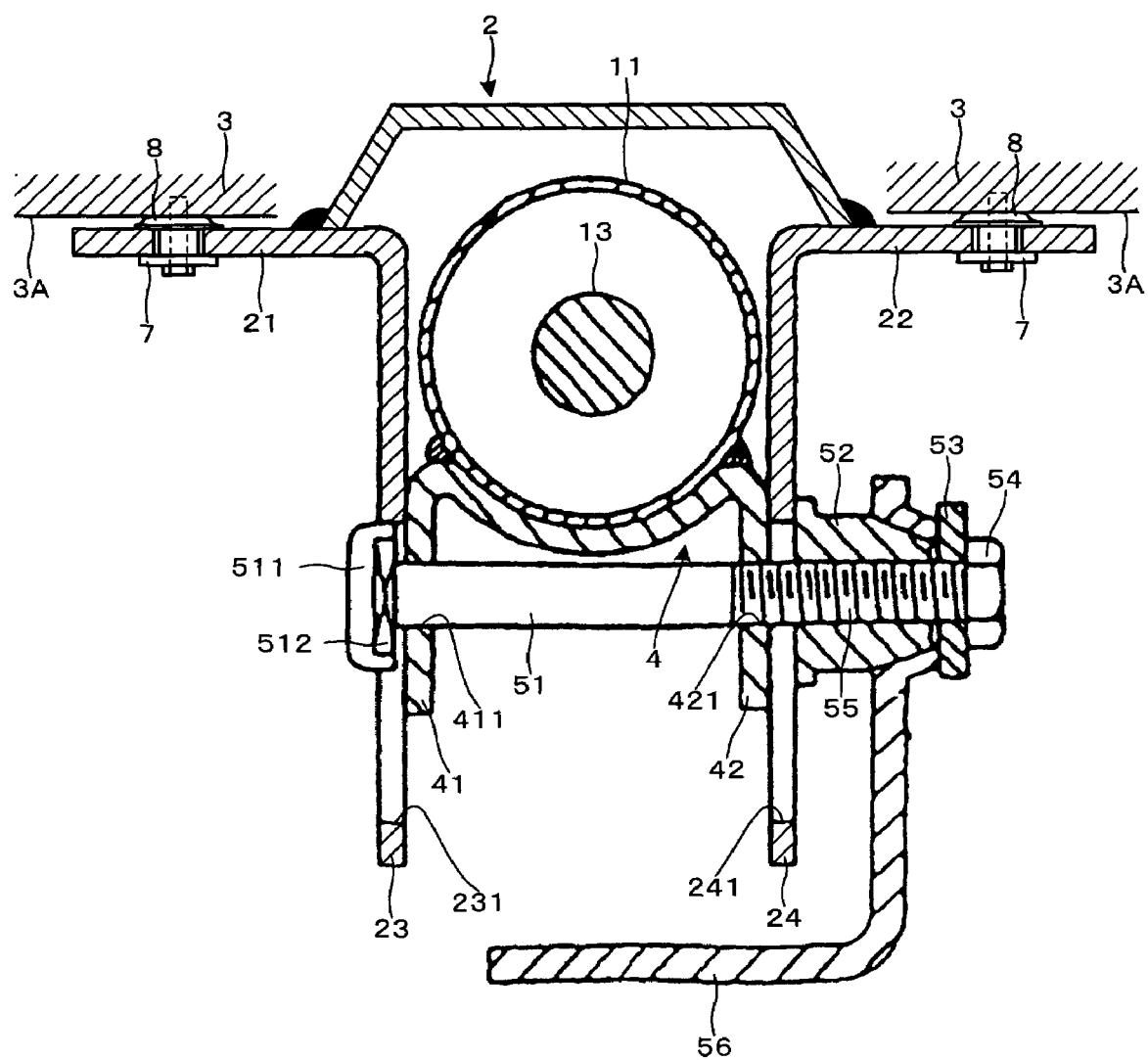
FIG. 2 is a cross-sectional view along the line A-A in FIG. 1.
Figure 3:
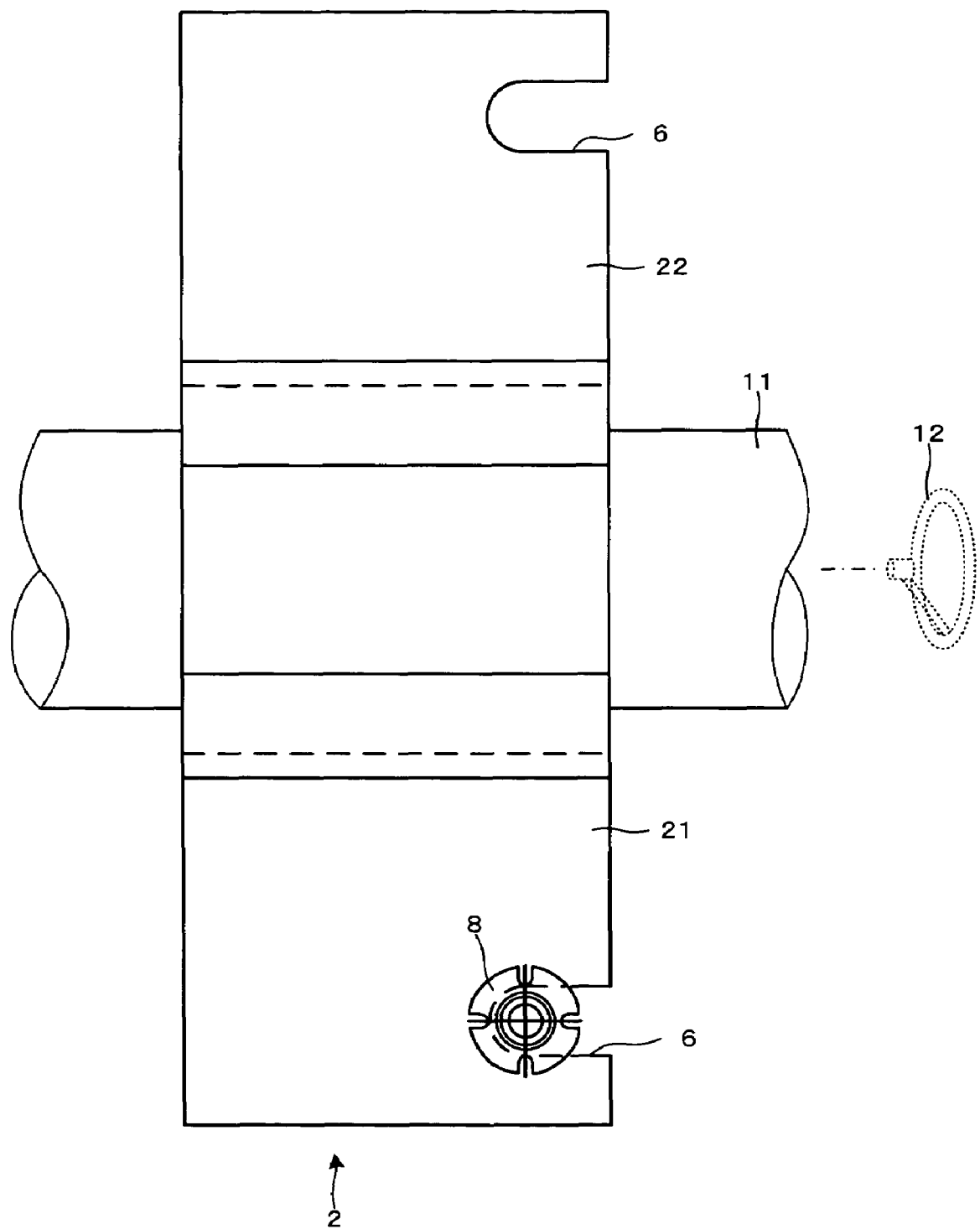
FIG. 3 is a plan view of an upper side body mounting bracket in FIG. 1.
Figure 4:
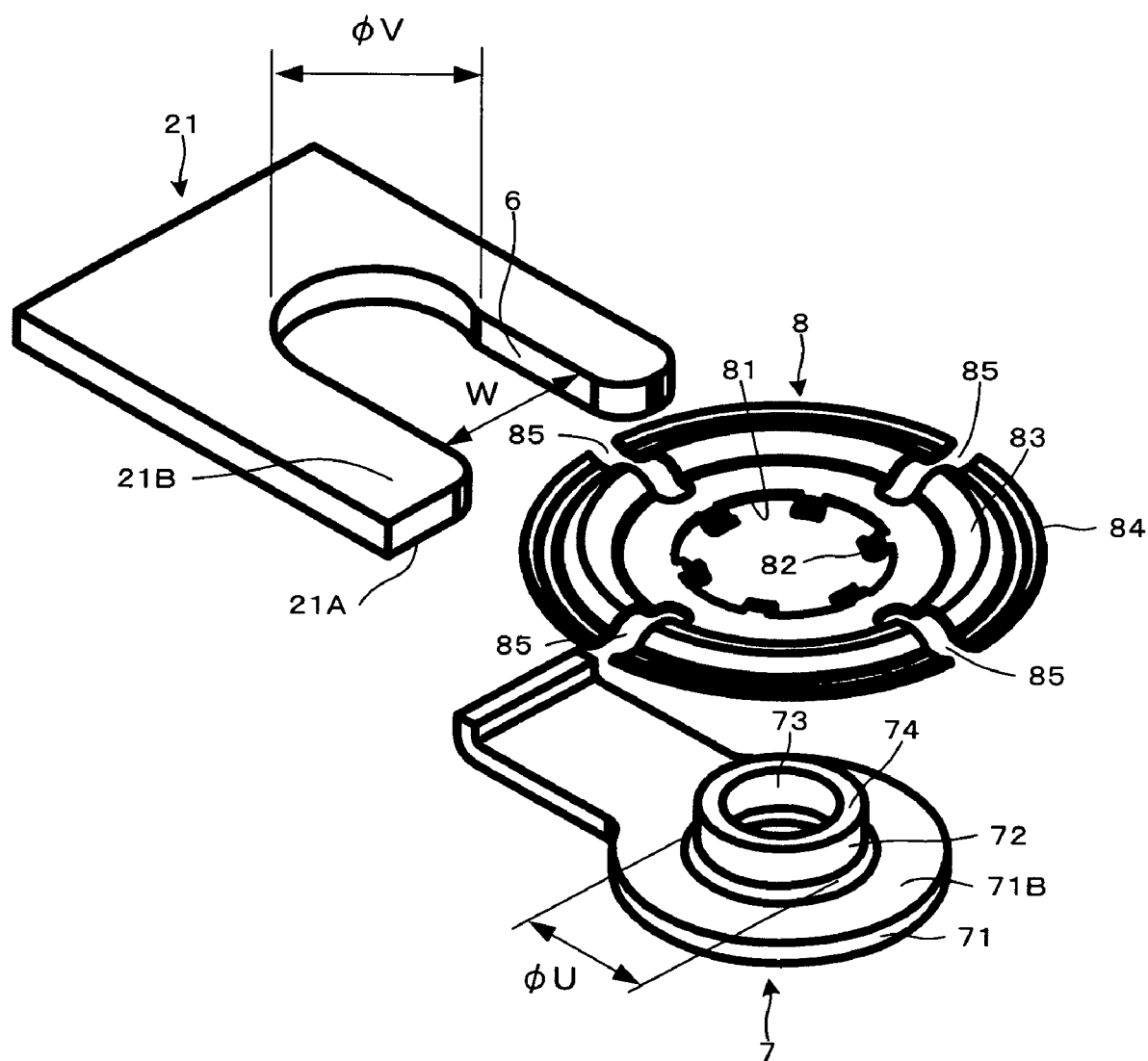
FIG. 4 is a disassembled perspective view of a capsule in a first embodiment of the present invention.
Figure 5:
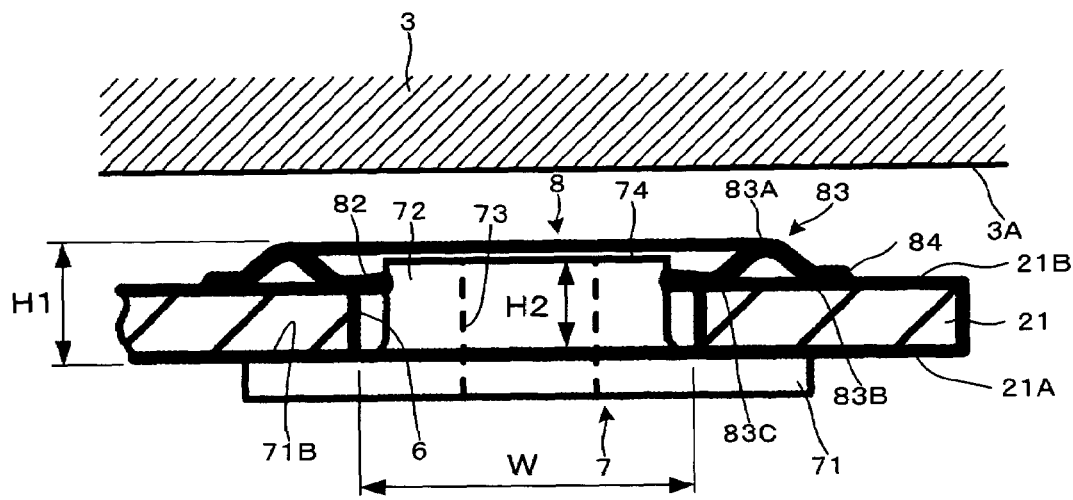
FIG. 5 is a cross-sectional view of a capsule in FIG. 4 illustrating the condition before tightening by bolt.
Figure 6:
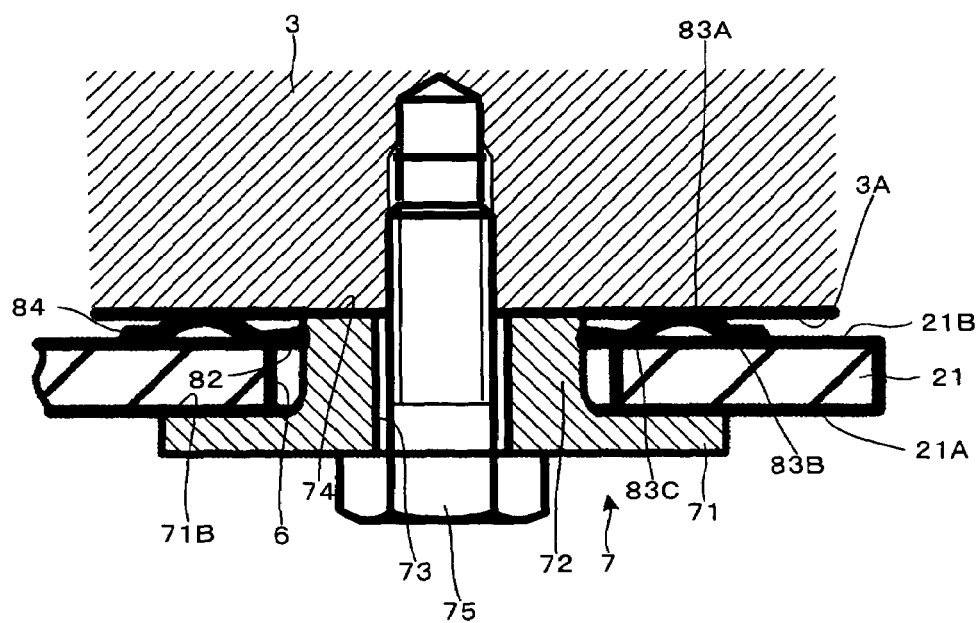
FIG. 6 is a cross-sectional view of the capsule in FIG. 4 illustrating the condition after tightening by bolt.

The preferred embodiments of the present invention will be explained with reference to the accompanying drawings. FIG. 1 is a side elevation of a steering column device as a whole of the embodiments of the present invention. FIG. 2 is a cross-sectional view along the line A-A in FIG. 1. FIG. 3 is a plan view illustrating an upper side body mounting bracket in FIG. 1. FIG. 4 is a disassembled perspective view of a capsule in a first embodiment of the present invention. FIG. 5 is a cross-sectional view of the capsule in FIG. 4, illustrating the condition before tightening by bolt. FIG. 6 is a cross-sectional view of the capsule in FIG. 4, illustrating the condition after tightening by bolt.

FIGS. 1 to 3 illustrate the embodiments in which the present invention is adapted to a tilt type steering column device. Within an internal diameter part of an outer column 11, a steering shaft 13 loading a steering wheel 12 in the body backward side is pivotally supported to be rotatable with a bearing not illustrated. The outer column 11 is externally engaged to be movable in the axial direction of an inner column 14. In the body forward side of the inner column 14, a lower side body mounting bracket 15 is pivotally supported to be tilted to the body 3 with a pivot pin 16.

The outer column 11 is provided with a distance bracket 4 fixed by the welding process to the lower side thereof. The right and left side plates 41, 42 of the distance bracket 4 are held by the internal sides of the right and left side plates 23, 24 of the upper side body mounting bracket 2. At the upper end of the side plates 23, 24, the right and left flanges 21, 22 which are extending after being bent to the external side in the L-shape are integrally formed. These flanges 21, 22 are mounted to the body 3.

The side plates 23, 24 are provided with longer grooves 231, 241 formed for tilting purpose. The longer grooves 231, 241 for tilting are formed like arcs formed around the pivot pin 16 explained above. To the right and left side plates 41, 42 of the distance bracket 4, circular through-holes 411, 421 are formed in the right and left directions in FIG. 2.

A round-rod type tightening rod 51 is inserted from the left side of FIG. 2 through the longer grooves for tilting 231, 241 and through-holes 411, 421. At the left end of the tightening rod 51, a cylindrical head 511 is formed, while at the right side external diameter part of the head 511, a rotation stopper 512 having the rectangular cross-section which is a little narrower in the width than the width of the longer groove for tilting 231 is formed. The rotation stopper 512 is engaged with the longer groove for tilting 231 to stop rotation of the tightening rod 51 against the upper side body mounting bracket 2 and also causes the tightening rod 51 to slide along the longer groove 231 for tilting at the time of adjusting the tilting location.

At the right end external circumference of the tightening rod 51, a tightening rod 52, a washer 53, an adjusting nut 54 are externally tightened in this sequence and the female threads formed at the internal diameter part of the tightening nut 52 and adjusting nut 54 are threaded into a male thread 55 formed at the right end of the tightening rod 51.

At the right end surface of the tightening nut 52, a manipulation lever 56 is fixed and this manipulation lever 56 is capable of clamping the right and left side plates 41, 42 of the distance bracket 4 to the predetermined tilt position.

When the manipulation lever 56 is rotated at the time of tilt tightening, the tightening nut 52 is pushed to the left side of FIG. 2 and simultaneously the side plates 23, 24 are tightened by pulling the tightening rod 51 to the right side. Accordingly, the right and left side plates 41, 42 of the distance bracket 4 can be tightened to the side plates 23, 24.

For canceling the tilting, the manipulation lever 56 is rotated in the inverse direction to cancel the force to push the tightening nut 52 to the left side, the side plates 23, 24 are separated with each other by canceling the force to pull the tightening rod 51 to the right side, and tightening of the right and left side plates 41, 42 of the distance bracket 4 is cancelled.

As illustrated in FIG. 3, almost U-shape cut-away grooves 6, 6 with the body backward side (right side in FIG. 3) opened are formed to the right and left flanges 21, 22 and the right and left flanges 21, 22 are mounted to the body to be removable by utilizing this cut-away grooves 6, 6. FIGS. 4 to 6 illustrate the first embodiment showing a method of mounting one flange 21 to the body 3. A method of mounting the other flange 22 to the body 3 is identical to that of one flange 21 and is therefore not described here.

As illustrated in FIG. 4 to FIG. 6, a capsule for mounting the flange 21 to the body 3 is constituted with a collar 7, a ring 8 and a bolt 75. The collar 7 is formed of a conductive material with inclusion of a larger diameter flange 71 which is larger than the width W of the cut-away groove 6 and a small diameter cylinder 72 which is smaller than the width W of the cut-away groove 6. At the axial center, a through-hole 73 is formed for insertion of the bolt 75. As the material of collar 7, low carbon steel, aluminum, magnesium or the like are considered but it is desirable that hardness is lower than the material of ring 8. In the collar 7, the small diameter cylinder 72 is inserted into the cut-away groove 6 and the upper surface 71B of the large diameter flange 71 is placed in contact with the lower surface 71A of the flange 21.

The ring 8 has an external shape having the diameter which is larger than the groove width W of the cut-away groove 6 and is formed of a conductive disk type thin plate. This disk type thin plate is molded by bending into the predetermined shape of cross-section with a press machine. The ring 8 is inserted between the upper surface 21B of the flange 21 and the lower surface 3A of the body 3. At the center of ring 8, a round hole 81 is formed. This round hole 81 is provided with six pawls 82, keeping the equal interval on the circumference thereof, which are radially extended toward the center of the ring 8. A diameter size of an inscribed circle at the internal side of the pawl 82 is formed in the diameter a little smaller than the external diameter size of the small diameter cylinder 72.

Accordingly, when the ring 8 is pushed toward the small diameter cylinder 72 of the collar 7, the pawl 82 is engaged with the small diameter cylinder 72 while it is widened to the external side of the radial direction and the internal side of the pawl 82 eats the external circumference of the small diameter cylinder 72 with elasticity thereof. As a result, the ring 8 and the collar 7 are coupled. Namely, the pawl 82 has the function of a push-nut.

As is apparent from FIG. 5 and FIG. 6, an elastic deforming part 83 having the cross-section curved like a mound is formed annularly in the surrounding of the round hole 81 of the ring 8, the top 83A of the mound of the elastic deforming part 83 is facing to the body 3, and the bottoms 83B, 83C of the mound are facing to the flange 21. In the condition before tightening by bolt illustrated in FIG. 5, the height H1 up to the top 83A of the mound of the elastic deforming part 83 from the lower surface 21A of flange 21 is set higher than the height H2 of the small diameter cylinder 72.

Moreover, as illustrated in FIG. 4, the four slits 85 are formed to the ring 8, keeping the equal interval on the circumference, in radial toward the center of the ring 8 from the external circumference 84 of the ring 8. Owing to these slits 85, the ring 8 is smoothly deformed elastically and easily crushed when the ring 8 is tightened with the bolt 75.

As illustrated in FIG. 6, when the bolt 75 is inserted into the through-hole 73 of the collar 7 and the bolt 75 is threaded into the body 3, the elastic deforming part 83 of the ring 8 is crushed with the tightening force of the bolt 75. The bolt 75 is tightened until the upper end surface 74 of the small diameter cylinder 72 is in contact with the lower surface 3A of the body 3 and the elastic deforming part 83 of the ring 8 is crushed as much as difference between the heights H1 and H2. The flange 21 is tightened to the body with elasticity when the elastic deforming part 83 of the ring 8 is crushed and thereby a removing load when the upper side body mounting bracket 2 is removed from the body 3 can be set.

As a material of the ring 8, stainless steel plate, high-tension steel plate, rolled steel plate or the like may be considered but the spring steel is most desirable. In addition, desirable hardness of material of the ring 8 is ranged from HRC 35 to 40.

In the first embodiment of the present invention, if an error exists in the heights of flange 21, ring 8, small diameter cylinder 72 of the collar 7, these errors of heights are absorbed and the upper body mounting bracket 2 can be mounted to the body 3 with the constant removing load because the ring 8 is crushed. Moreover, since a resin pin is not provided in this method, higher vibration rigidity is assured and the power feeding path can be surely attained.

An external diameter of the small diameter cylinder 72 of the collar 7 is set smaller than the width W of the cut-away groove 6. Accordingly, since the collar 7 and ring 8 can be adjusted in the locations thereof as much as the gap in the forward and backward directions of body and right and left directions of boy at the time of assembling, these can be mounted easily through absorption of fluctuation in locations of the bolt hole in the side of body 3 and manufacturing error in the upper body mounting bracket 2.

In this embodiment, since the elastic deforming part 83 is formed annularly, it is not required to consider the phase of ring 8 at the time of assembling the ring 8, the assembling work desirably becomes easier but it is also possible to form the elastic deforming part 83 into the shape other than the annular shape, for example, into a rectangular shape.

Moreover, since the ring 8 can be tightened in wider area to the body 3 and flange 21 when the location of the elastic deforming part 83 is separated from the center of the ring 8, it is desirable from the viewpoint of improvement in rigidity at the time of tightening. Moreover, the top 83A of the mound of the elastic deforming part 83 is facing to the body 3 and the bottom points 83B, 83C of the mound are facing to the flange 21 in this embodiment, it is also possible that the top 83A of the mound is set in the side of flange 21 and the bottom points 83B, 83C of the mound are set to the side of body 3, in accordance with the mounting area in the side of the body 3 and flange 21.

Figure 7:
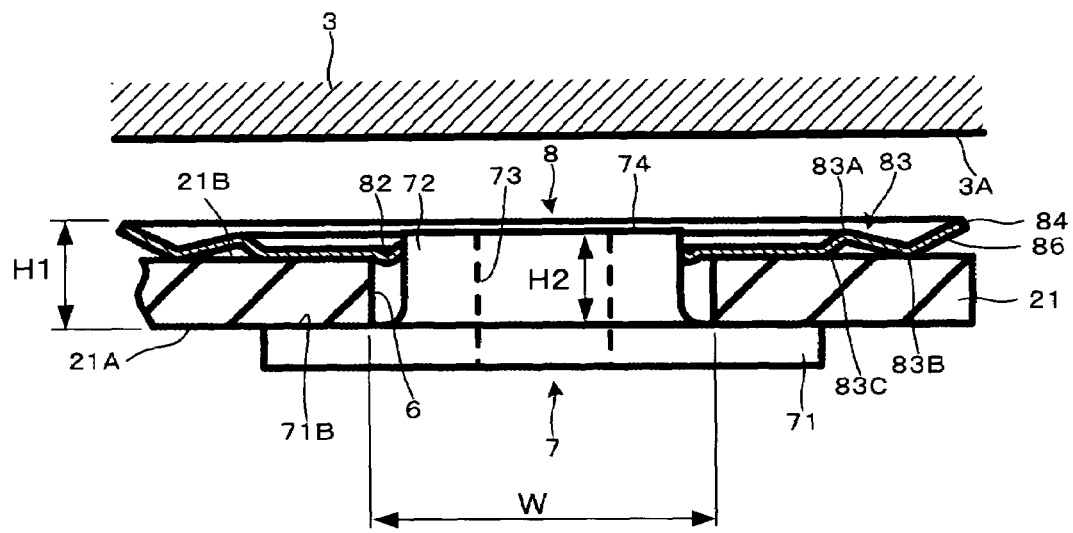
FIG. 7 is a cross-sectional view of the capsule as a second embodiment of the present invention illustrating the condition before tightening by bolt.

Next, a second embodiment of the present invention will be explained below. FIG. 7 is a cross-section of the capsule in the second embodiment of the present invention illustrating the condition before tightening by bolt. In the following explanation, only the structure different from that of the first embodiment will be explained without duplication. The second embodiment is characterized in that a bending part 86 is formed by bending the external circumference 84 of the ring 8 to the side of the body 3.

In other words, with shock of the secondary collision, the flange 21 is separated by sliding over the area between the ring 8 and the upper surface 71B of the large diameter flange 71 but since the bending part 86 is formed with bending toward the body 3 at the external circumference 84 of the ring 8, if burrs exist at the external circumference 84 of the ring 8, the flange 21 can be removed smoothly without catching by the burrs, resulting in the stable removing load.

Figure 8:
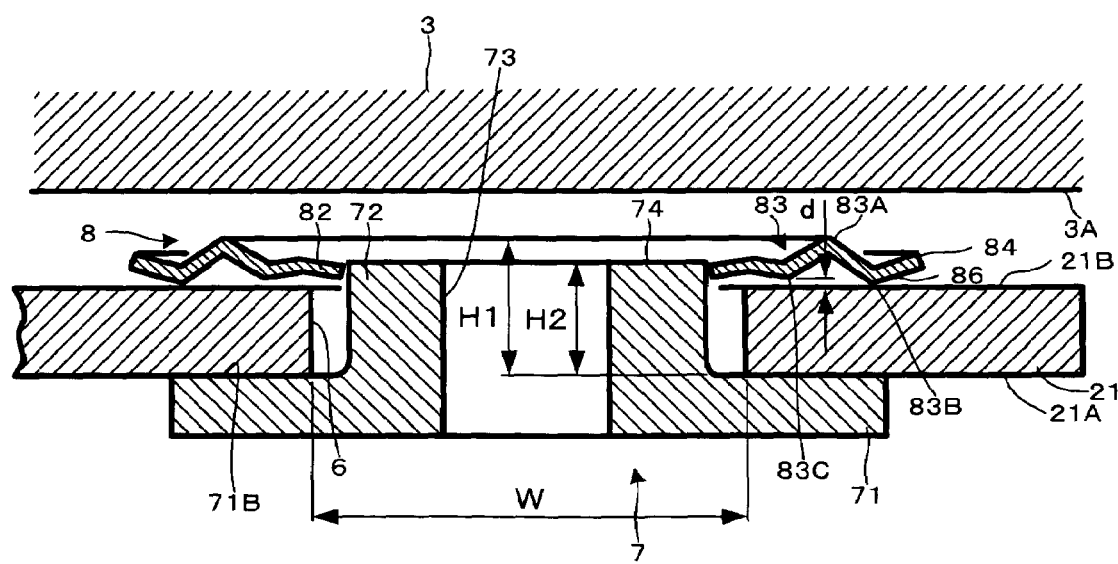
FIG. 8 is a cross-sectional view of the capsule as a third embodiment of the present invention illustrating the condition before tightening by bolt.

Next, a third embodiment of the present invention will be explained. FIG. 8 is a cross-sectional view of the capsule in the third embodiment of the present invention, illustrating the condition before tightening by bolt. In the following explanation, only the structure different from that of the first embodiment will be explained without duplication. The third embodiment is characterized in that one bottom point 83C among two bottom points 83B, 83C of the mound of the elastic deforming part 83 has a gap d toward the upper surface 21B of the flange 21 in the condition before tightening by bolt but is in contact with the upper surface 21B of the flange 21 through the elastic deformation under the condition after tightening by bolt.

In other words, the external bottom point 83B is in contact with the upper surface 81B of flange 21 under the condition before tightening by bolt but the center side bottom point 83C has a gap toward the upper surface 21B of flange 21. However, when the bolt is tightened, the ring 8 is elastically deformed and the center side bottom point 83C is also in contact with the upper surface 21 of flange 21. As described above, the ring 8 is capable of changing a spring constant for elastic deformation before and after the center side bottom point 83C is in contact with the upper surface 21B of flange 21. As a modification of the third embodiment, it is also possible that the center side bottom point 83C is in contact with the upper surface 21B of flange 21 under the condition before tightening by bolt and the external side bottom point 83B has a gap d toward the upper surface 21B of flange 21.

Figure 9:
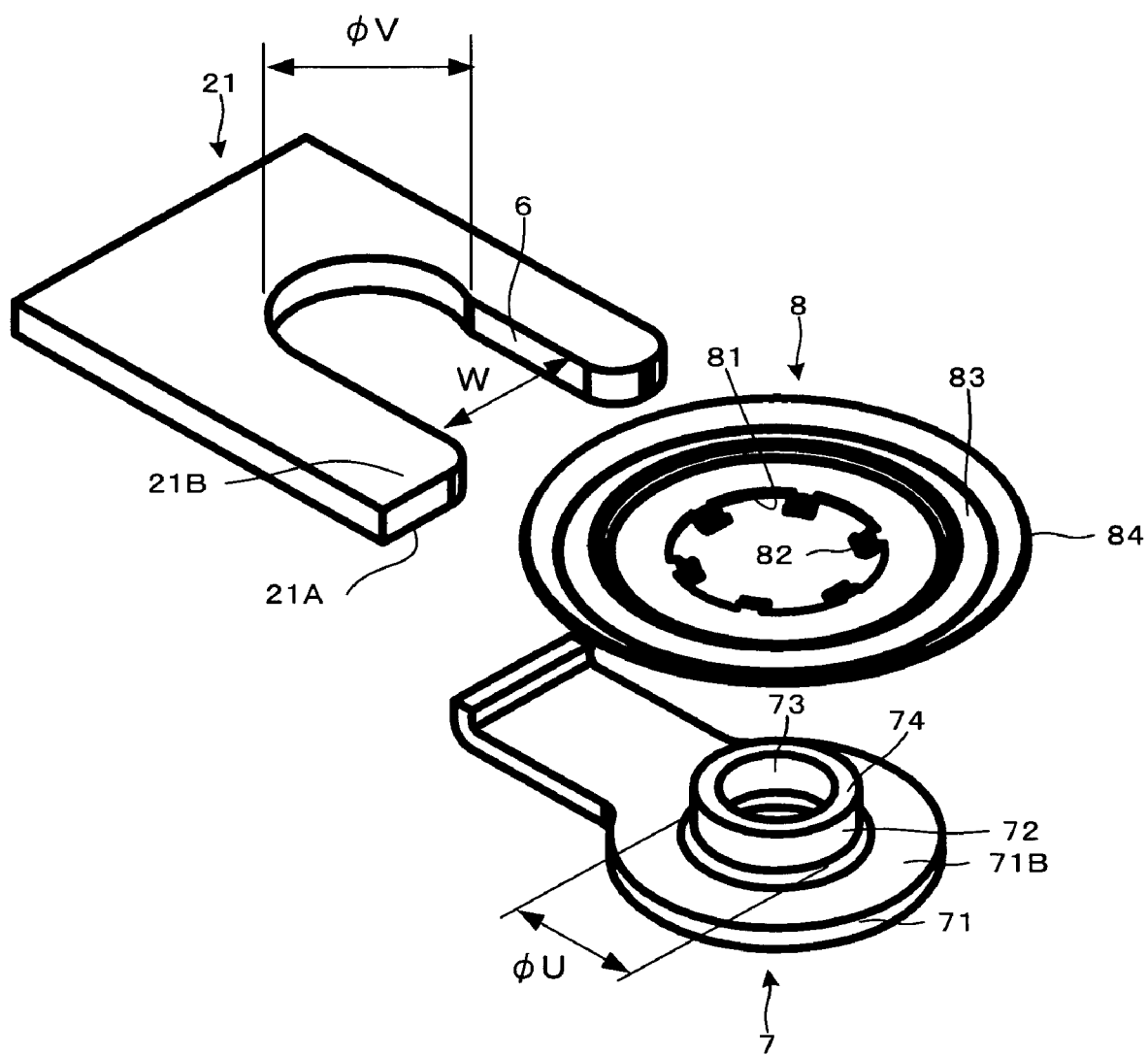
FIG. 9 is a disassembled perspective view of the capsule as a fourth embodiment of the present invention.

Next, a fourth embodiment of the present invention will be explained. FIG. 9 is a disassembled perspective view of the capsule in the fourth embodiment of the present invention. In the following explanation, only the structure different from that of the third embodiment will be explained without duplication. The fourth embodiment is characterized in that the slit 85 of the third embodiment not illustrated is aborted and the ring 8 is placed inversely. Namely, the top 83A of the mound is set to the side of flange, while the bottom points 83B, 83C of the mound area set facing to the side of body 3.

Figure 10:
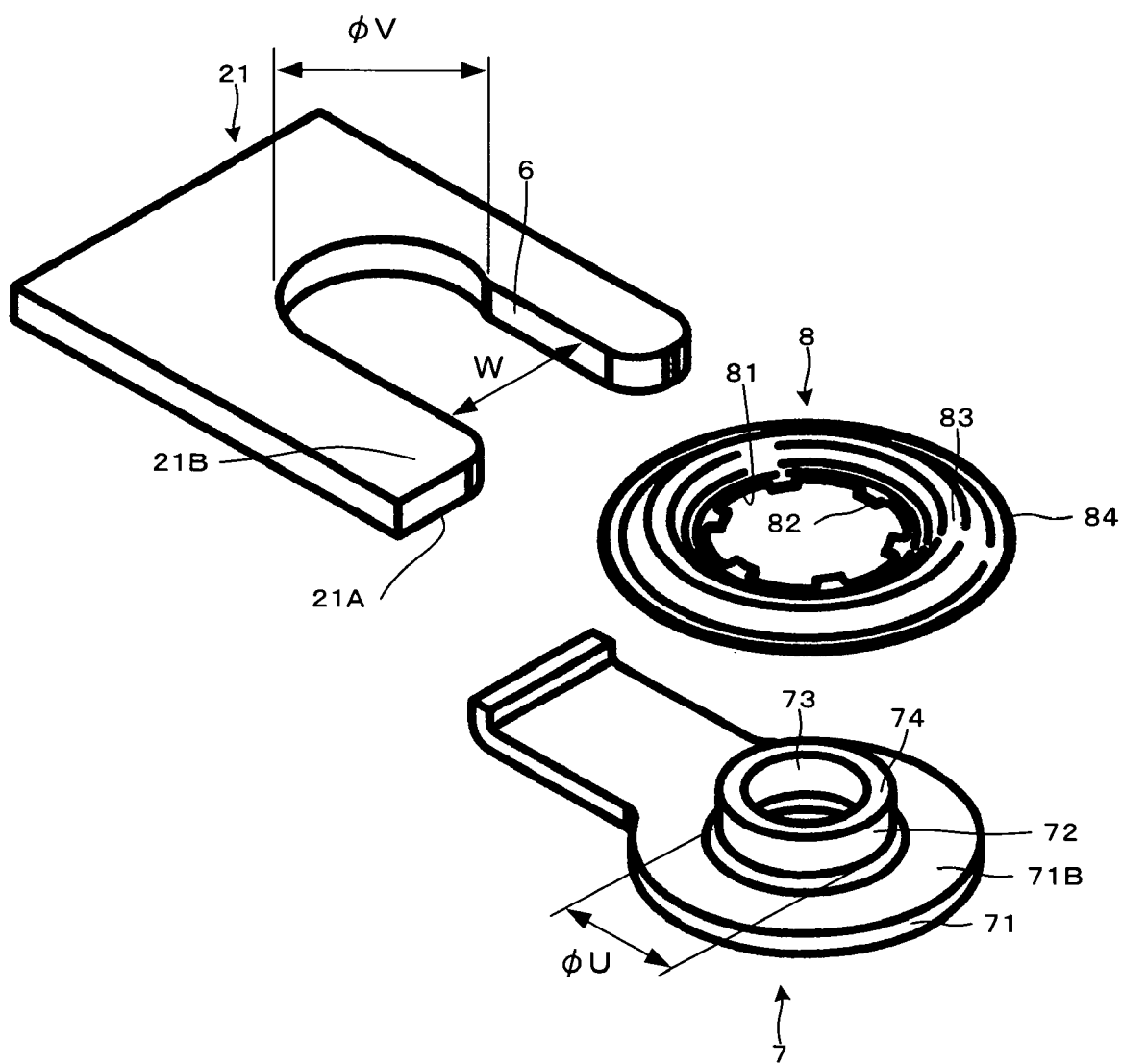
FIG. 10 is a disassembled perspective view of the capsule as a fifth embodiment of the present invention.

Next, a fifth embodiment of the present invention will be explained. FIG. 10 is a disassembled perspective view of the capsule in the fifth embodiment of the present invention. Only the structure different from that of the first embodiment will be explained without duplication. The fifth embodiment is characterized in that the slit 85 has been aborted.

Figure 11:
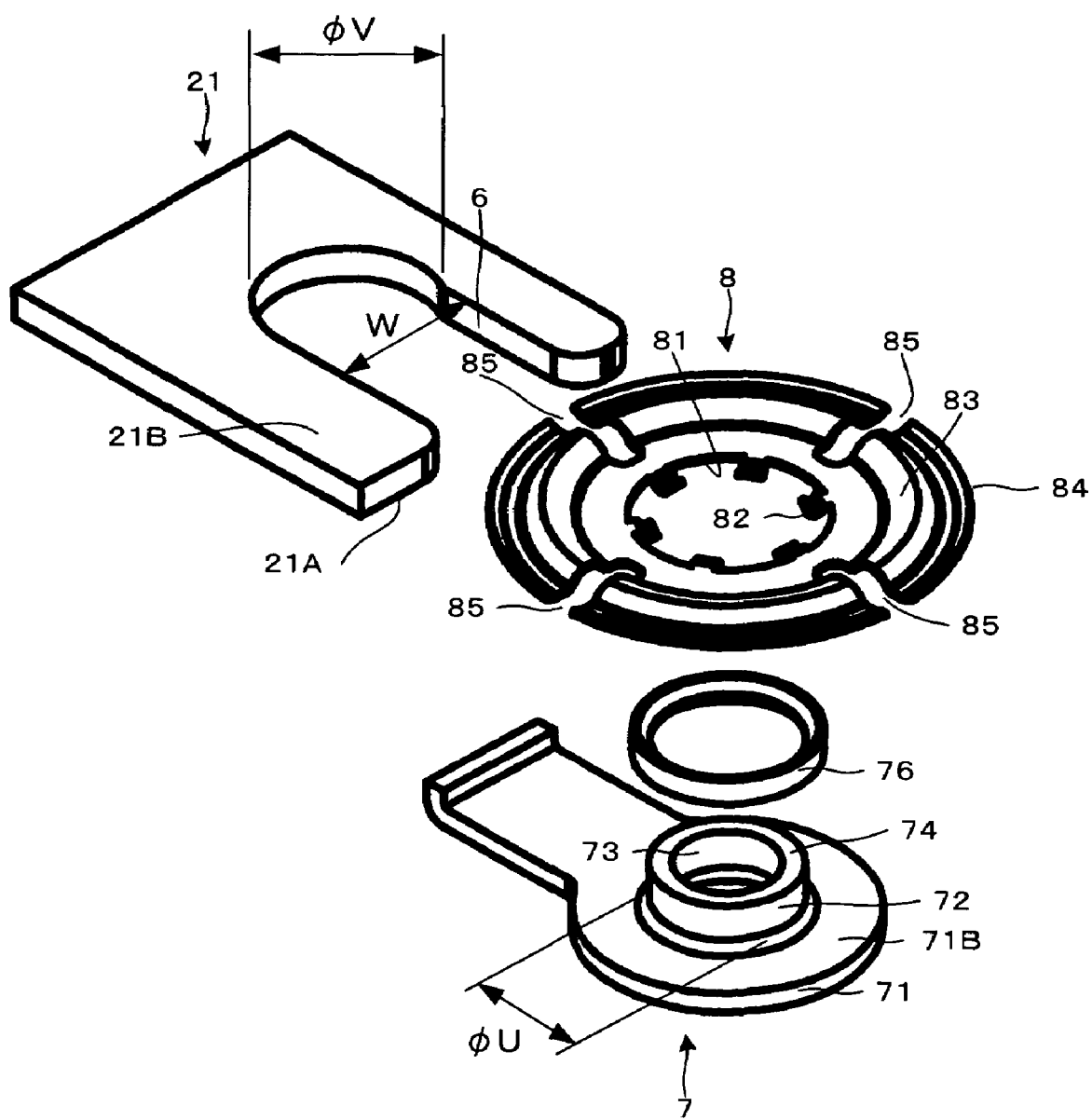
FIG. 11 is a disassembled perspective view of the capsule as a sixth embodiment of the present invention.
Figure 12:
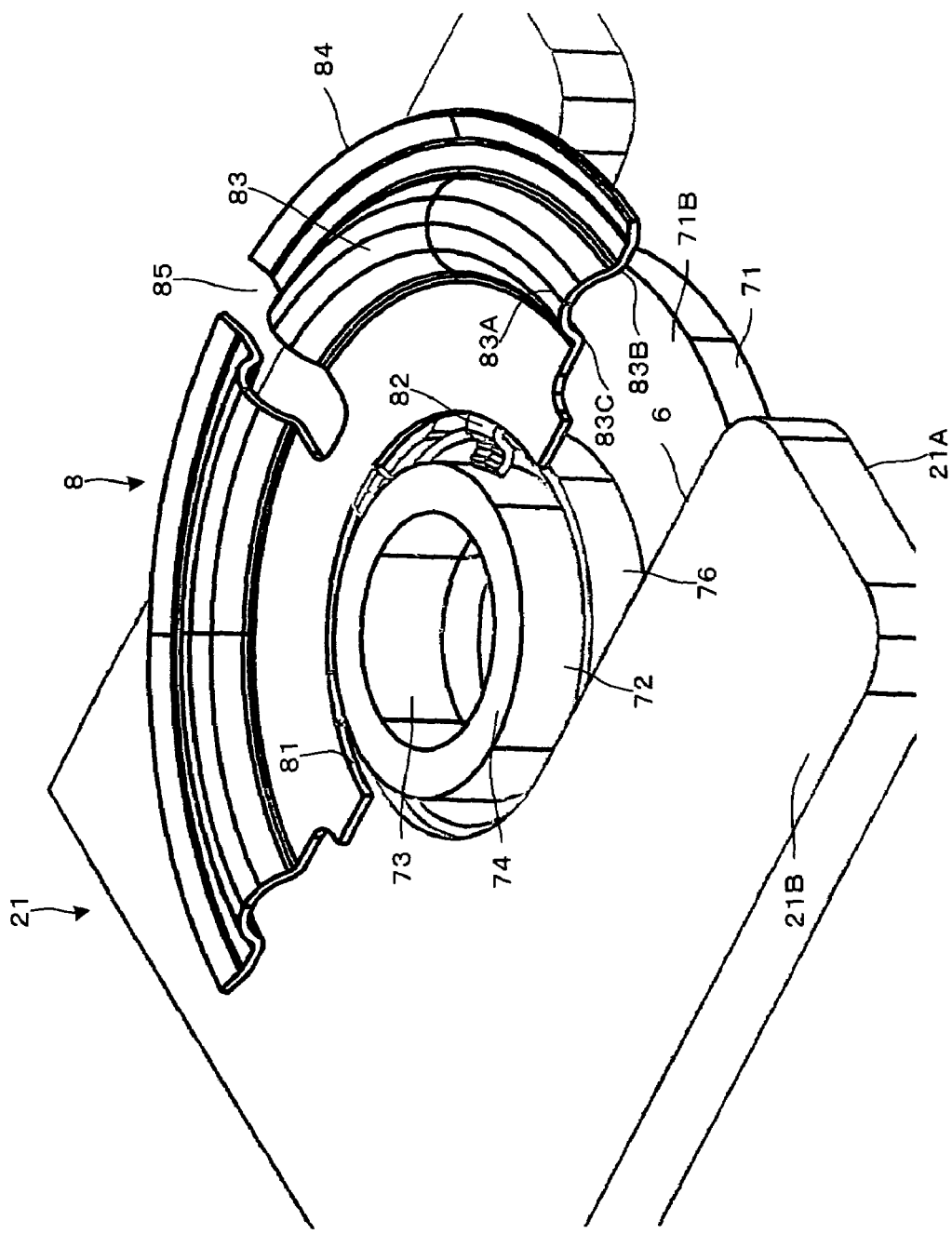
FIG. 12 is a perspective view of the capsule in FIG. 11 illustrating the assembled condition.
Figure 13:
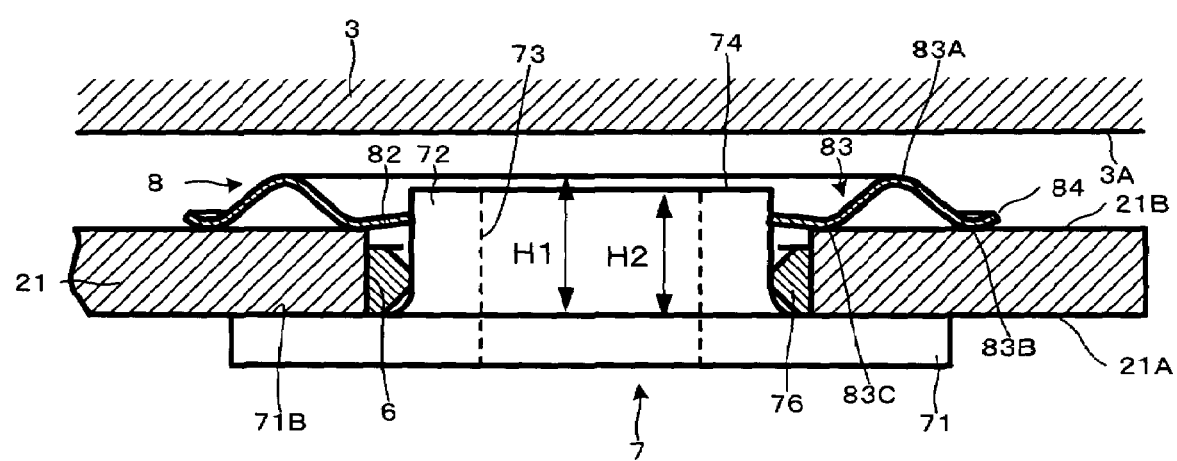
FIG. 13 is a cross-sectional view of the capsule in FIG. 11 illustrating the condition before tightening by bolt.

Next, a sixth embodiment of the present invention will be explained. FIGS. 11 to 13 illustrate the sixth embodiment of the present invention. FIG. 11 is a disassembled perspective view of the capsule. FIG. 12 is a perspective view of the capsule in FIG. 11 illustrating the assembled condition. FIG. 13 is a cross-sectional view of the capsule in FIG. 11, illustrating the condition before tightening by bolt. In the following explanation, only the structure different from that of the first embodiment will be explained without duplication. The sixth embodiment is characterized in that a resin bush 76 is inserted into a gap between the cut-away groove 6 and the external circumference of the small diameter cylinder 72.

The resin bush 76 is formed in the hollow cylindrical shape and an external diameter size thereof is set to the size just engaged with the widest part of the groove of the cut-away groove 6. An internal diameter size of the resin bush 76 is set to the size just engaged with an external diameter of the small diameter cylinder 72 of the collar 7. In the sixth embodiment, in view of making small the contact area between the external diameter of the small diameter cylinder 72 of collar 7 and the internal diameter of the resin bush 76, the fillet process is implemented to the internal diameter side of the both end surfaces of the resin bush 76 to form the internal diameter side of the resin bush 76 higher than the external diameter side thereof. However, height of the internal diameter side of resin bush 76 may be formed in the equal height of the external diameter side thereof.

Accordingly, when the steering column device is temporarily placed at the mounting location to the body before tightening by bolt, the resin bush 76 is never removed to the body backward side of the cut-away groove 6. Therefore, the temporary setting condition of the steering column device can be maintained and thereby mounting work to the body becomes easier as much.

Figure 14:
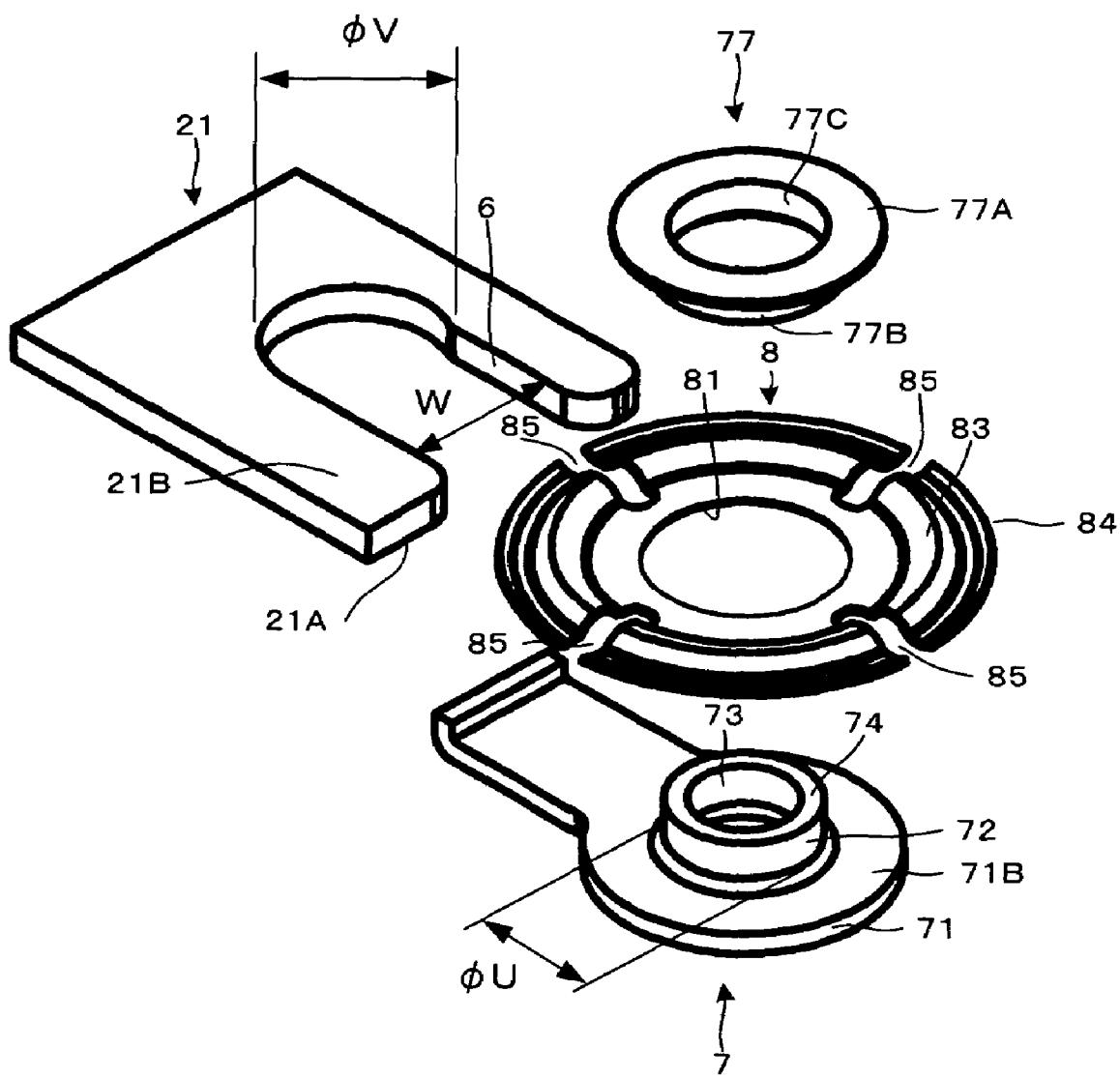
FIG. 14 is a disassembled perspective view of the capsule as a seventh embodiment of the present invention.
Figure 15:
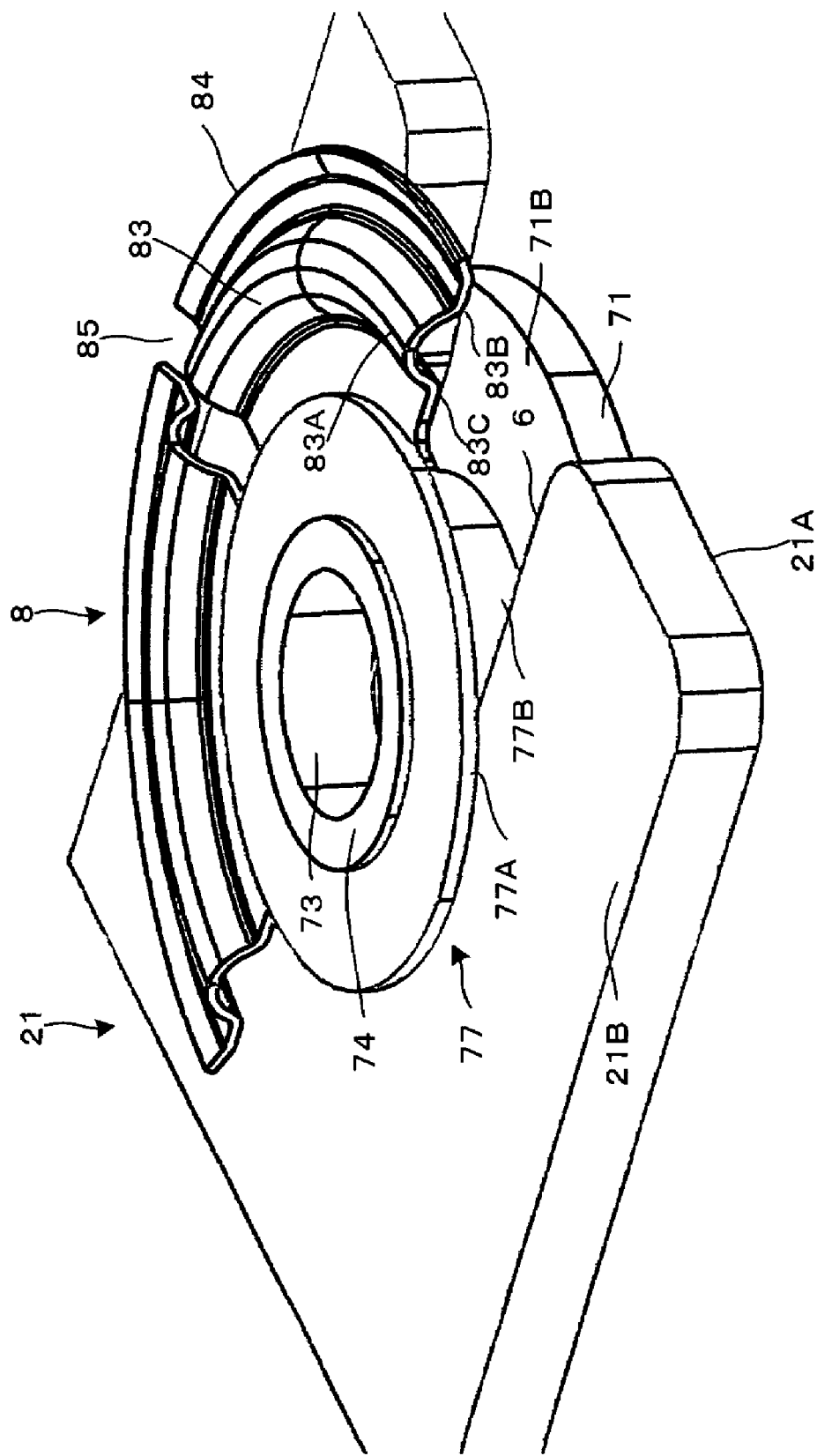
FIG. 15 is a perspective view of the capsule in FIG. 14 illustrating the assembled condition.
Figure 16:
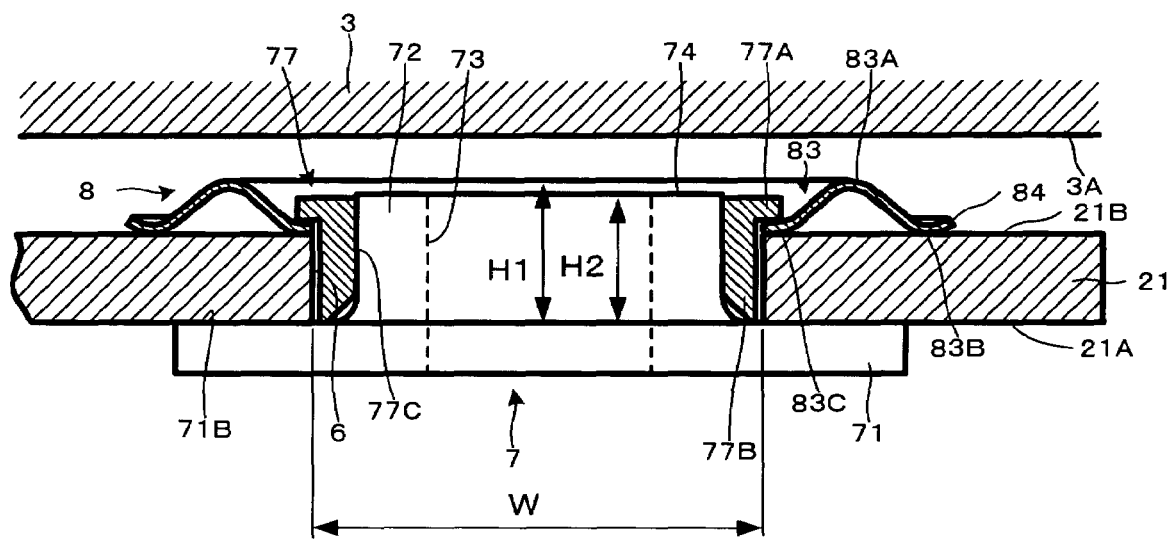
FIG. 16 is a cross-sectional view of the capsule in FIG. 14 illustrating the condition before tightening by bolt.

Next, a seventh embodiment of the present invention will be explained. FIGS. 14 to 16 illustrate the seventh embodiment of the present invention. FIG. 14 is a disassembled perspective view of the capsule. FIG. 15 is a perspective view of the capsule in FIG. 14 illustrating the assembled condition. FIG. 16 is a cross-sectional view of the capsule illustrating the condition before tightening by bolt. In the following explanation, on the structure different from that of the first embodiment will be explained without duplication. The seventh embodiment is characterized in that the pawl 8 of ring 8 is aborted and the ring 8 and collar 7 are coupled with the resin bush 77.

Namely, the pawl 82 as explained in the first embodiment is not provided in the round hole 81 of the ring 8 and the internal diameter size of the round hole 81 is set in almost equal size of the width W of the cut-away groove 6. The resin bush 77 includes the large diameter flange 77A which is larger than the internal diameter size of the round hole 81 and the small diameter cylinder 77B which is smaller than the width W of the cut-away groove 6. The internal diameter size of the through-hole 77C of the resin bush 77 is set a little smaller than the external diameter size of the small diameter cylinder 72 of the collar 7.

Accordingly, when the resin bush 77 is pushed toward the collar 7 from the upper direction of the ring 8, the through-hole 77C of the resin bush 7 is engaged with pressure with the external diameter of the small diameter cylinder 72. Thereby the resin bush 77 is coupled with the collar 7 and simultaneously the ring 8 is clamped with the large diameter flange 77A of the resin bush 77.

Figure 17:
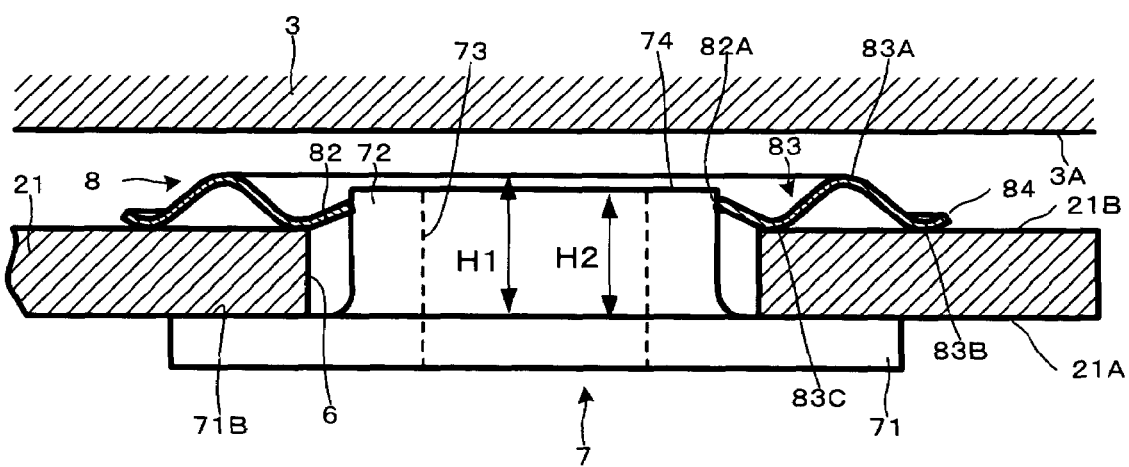
FIG. 17 is a cross-sectional view of the capsule as an eighth embodiment of the present invention illustrating the condition before tightening by bolt.

Next, an eighth embodiment of the present invention is explained. FIG. 17 is a cross-sectional view of the capsule of the eighth embodiment of the present invention illustrating the condition before tightening by bolt. In the following explanation, only the structure different from that of the first embodiment will be explained without duplication. The eighth embodiment is characterized in that the internal circumference 82A of the pawl 82 of the ring 8 is bent toward the side of the body 3.

Since the ring 8 is pushed to the small diameter cylinder 82 of the collar 7 from the side of the upper end surface 74 of the collar 7, when the internal circumference 82A of the pawl 82 of the ring 8 before assembling is bent toward the side of body 3, assembling of the ring 8 to the collar 7 becomes easier and erroneous assembling of ring 8 in the front and rear surfaces can be prevented.

Figure 18:
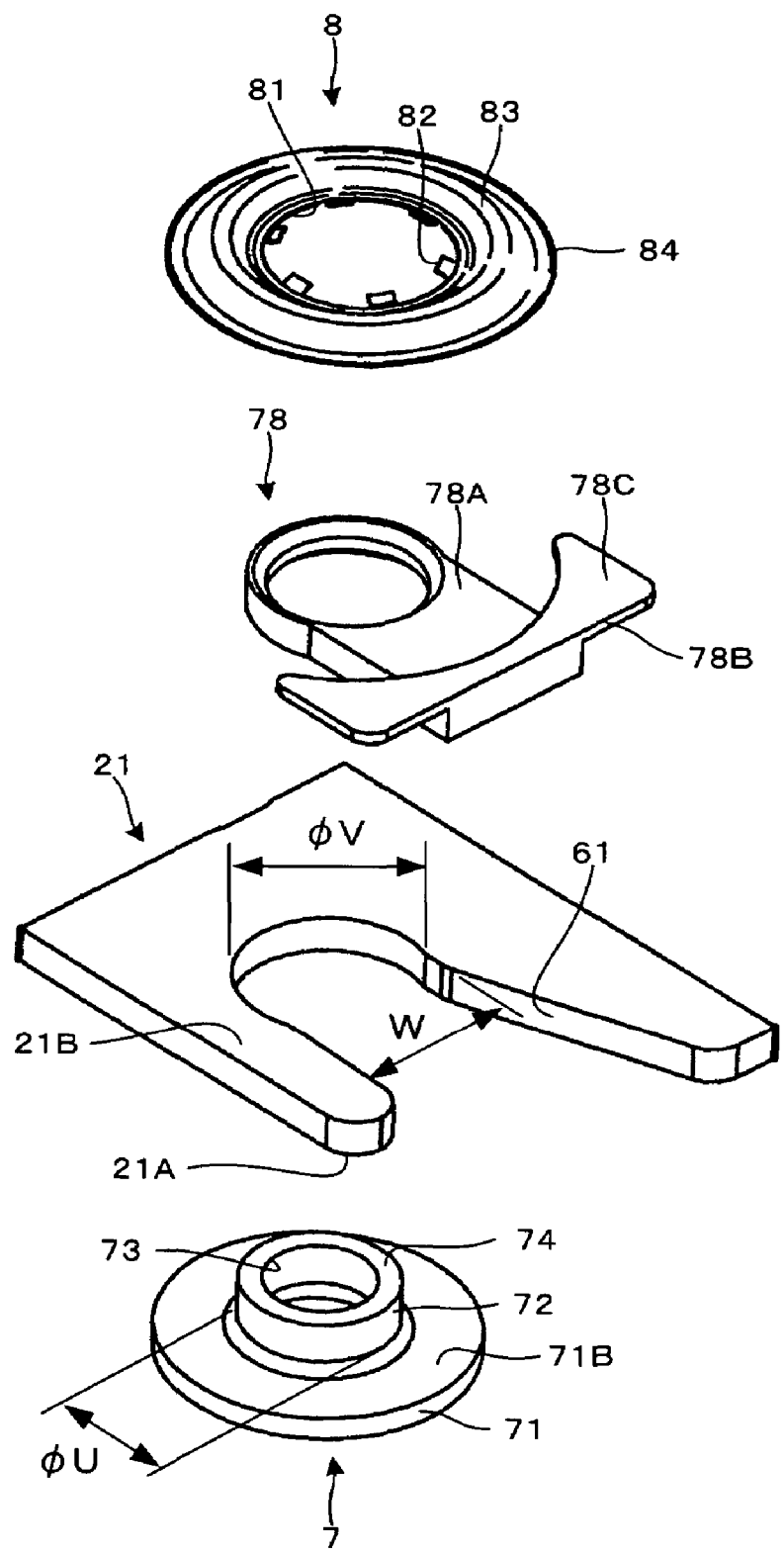
FIG. 18 is a disassembled perspective view of the capsule as a ninth embodiment of the present invention.
Figure 19:
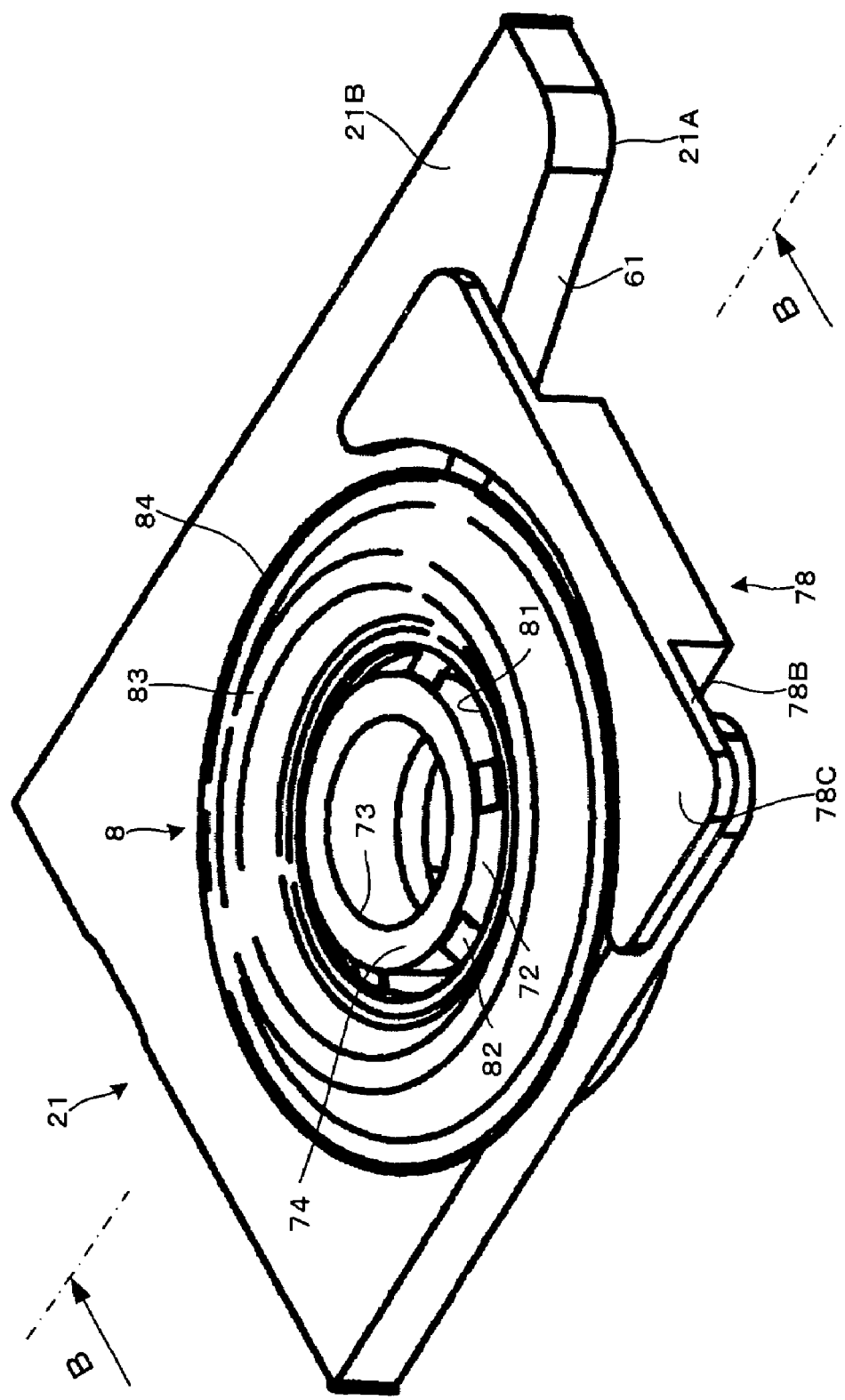
FIG. 19 is a perspective view of the capsule in FIG. 18 illustrating the assembled condition.
Figure 20:
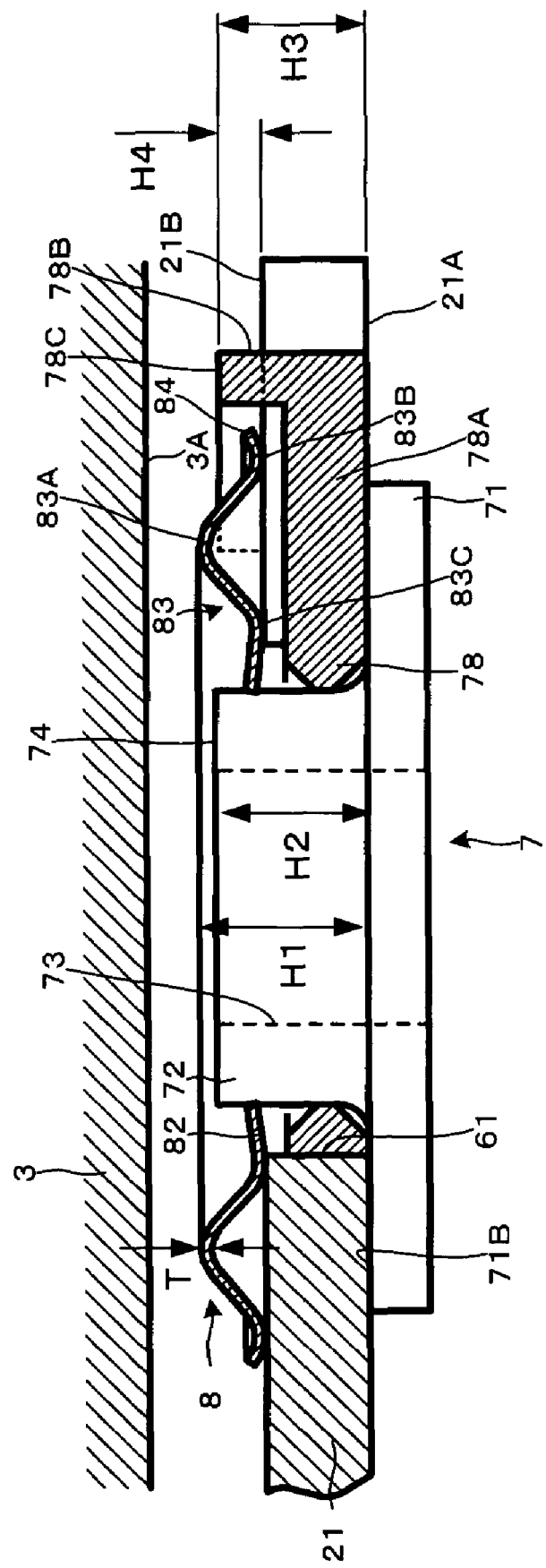
FIG. 20 is a cross-sectional view along the line B-B of the capsule in FIG. 19 illustrating the condition before tightening by bolt.

Next, a ninth embodiment of the present invention will be explained. FIGS. 18 to 20 are disassembled perspective views of the capsule in FIG. 18 illustrating the ninth embodiment of the present invention. FIG. 19 is a perspective view of the capsule in FIG. 18 illustrating the assembled condition. FIG. 20 is a cross-sectional view along the line B-B of the capsule in FIG. 19 illustrating the condition before tightening by bolt. In the following explanation, only the structure different from that of the above embodiments is explained without duplication. The ninth embodiment is characterized in that the resin bush is provided with the contact surface formed to be projected to the external side than the external circumference of the ring and also projected to the body side than the contact surface between the flange and ring.

As illustrated in FIG. 18 to FIG. 20, the flange 21 is provided with the almost U-shape cut-away groove 61 which is opened in the body backward side (right side in FIG. 18) and is gradually widened toward the body backward side. The flange 21 is removably mounted to the body using such cut-away groove 61. The figure shows a method for mounting to the body 3 in the side of one flange 21. The method for mounting to the body 3 in the side of the other flange is identical to that in the side of one flange 21 and the explanation thereof is omitted here.

The capsule used for mounting the flange 21 to the body 3 is constituted with the collar 7, ring 8, resin bush 78 and bolt not illustrated. The collar 7 is formed of a conductive material and is also constituted with the large diameter flange 71 which is larger than the width W of the narrowest part of the cut-away groove 61 and the small diameter cylinder 72 which is smaller in the external diameter than the width W of the cut-away groove 61. At the axial center thereof, a through-hole 73 is formed for insertion of the bolt. The collar 7 inserts the small diameter cylinder 72 to the cut-away groove 61 and places the upper surface 71B of the large diameter flange 71 to the lower surface 21A of flange 21.

The ring 8 includes the larger diameter external shape which is larger than the width W of the cut-away groove 61 and is formed of a conductive disc type thin plate. This ring 8 is molded by bending the disc type thin plate into the desired cross-sectional shape with a press machine. The ring 8 is inserted between the upper surface 21B of flange 21 and the lower surface 3A of body 3. At the center of ring 8, a round hole 81 is formed and this round hole 81 is provided, on the circumference, with the six pawls 82 keeping the equal interval between them which are radially extended toward the center of ring 8. The diameter size of an inscribed hole in contact with the internal side of pawl 82 is formed a little smaller than the external diameter size of the small diameter cylinder 72.

The resin bush 78 is formed in the hollow cylindrical. shape at the body forward side and the external diameter size thereof is set to the size for engagement with the width W of the narrowest part of the cut-away groove 61. The internal diameter size of the resin bush 78 is set to the size for engagement with the external diameter of the small diameter cylinder 72 of collar 7. In the ninth embodiment, in view of making small the contact area between the external diameter of the small diameter cylinder 72 of collar 7 and the internal diameter of resin bush 78, the internal diameter side of both end surfaces of resin bush 78 is filleted to form the internal diameter side of resin bush 78 which is higher than the external diameter side thereof. However, the internal diameter side of resin bush 78 may also be formed in the same height as the external diameter side.

Moreover, the resin bush 78 is provided with a backward extending part 78A formed extending toward the body backward side and the width of backward extending part 78A is set to the size for engagement with the width W of the narrowest part of the cut-away groove 61. Since the cut-away groove 61 is gradually widened toward the body backward side, facility is provided to easily comprise the backward extending part 78A of the resin bush 78 into the cut-away groove 61. The backward extending part 78A is provided with a projected part 78B formed to be projected to the external side than the external circumference 84 of ring 84 and to the side of body 3 than the upper surface 21B of flange 21.

Width of the projected part 78B is formed wider than the width of the widest part of the cut-away groove 61 and the contact surface 78C facing to the lower surface 3A of body 3 is formed on the upper surface of the projected part 78B. It is enough for the contact surface 78C to be in the external side of the external circumference 84 of ring 8 and to be arranged at a part of the external circumference 84 of ring. The most desirable location of the contact surface 78C is selected in the body backward side but it may also be arranged in the body forward side or in the entire part of the external circumference 84 of ring 8.

Accordingly, when the ring 8 is pushed toward the small diameter cylinder 72 of collar 7 after the resin bush 78 is externally engaged with the small diameter cylinder 72 of collar 7, it is engaged with the small diameter cylinder 72 while the pawl 82 is widened to the external side of the radial direction. Thereby, the ring 8 and collar 7 are coupled because the internal side of the pawl 82 enters the external circumference of the small diameter cylinder 72 with an elastic force of the pawl 82.

Around the round hole 81 of ring 8, the elastic deforming part 83 which is curved in the cross-section in the form of mound is formed annularly. The top 83A of the mound of elastic deforming part 83 is facing to the body 3 and the bottom points 83B, 83C of the mound are facing to the flange 21. In the condition before tightening by bolt illustrated in FIG. 20, the height H1 up to the top 83A of the mound of the elastic deforming part 83 from the lower surface 21A of the flange 21 is set higher than the height H2 of the small diameter cylinder 72.

Moreover, the height H3 up to the contact surface 78C of resin bush 78 from the lower surface 21A of flange 21 is set lower than the height H2 of small diameter cylinder 72. In addition, the height H4 up to the contact surface 78C of resin bush 78 from the upper surface 21B of flange 21 is set higher than the plate thickness T of ring 8.

When the bolt not illustrated is inserted into the through-hole 73 of collar 7 and it is threaded to the body 3, the elastic deforming part 83 of ring 8 is crushed with the tightening force of the bolt. The bolt is tightened until the upper end surface 74 of the small diameter cylinder 72 is placed in contact with the lower surface 3A of body 3 and thereby the elastic deforming part 83 of ring 8 is crushed as much as difference of heights H1 and H2. With the elastic force having crushed the elastic deforming part 83 of ring 8, the flange 21 is tightened to the body 3, setting the removing load required when the upper body mounting bracket 2 is removed from the body 3. In this timing, the contact surface 78C of resin bush 78 is facing to the lower surface 3A of body 3 keeping a little gap thereto.

When an automobile collides with the other car, a driver runs into the steering wheel 12 in the form of second collision with the inertia, and the shock is generated to leap up the steering wheel 12, the shock works in the direction to leap up the body backward side of flange 21 in FIG. 20. When the body backward side of flange 21 is leaped up with this shock, the body backward side of elastic deforming part 83 of ring 8 is crushed and the contact surface 78C of resin bush 78 is placed in contact with the lower surface 3A of body 3.

Accordingly, in view of preventing increase in the removing load generated by further crush of the elastic deforming part 83 of ring 8 and preventing leap up of the body backward side of flange 21, the flange 21 smoothly moves in the body forward side leaving the collar 7, ring 8 and resin bush 78 in the side of body 3, and thereby it becomes possible to ease the shock of the secondary collision. As the material of resin bush 78, it is desirably thought to use a resin such as polyacetal (POM) having small friction coefficient and a metal material coated with a low friction material.

In this embodiment, the ring 8 is inserted between the body 3 and the upper surface 21B of flange 21 and the collar 7 is placed in contact with the side of lower surface 21A of flange 21, but it is also possible that the collar 7 is inserted between the body 3 and upper surface 21B of flange 21 and the ring 8 is placed in contact with the side of lower surface 21A of flange 21. Moreover, in this embodiment, the material of resin bush 76, 77 may be replaced with a metal material such as aluminum, and iron or a material coated with a low friction material.

In addition, in this embodiment, the removing load may be adjusted by conducting surface process to the collar 7 and ring 8 and coating a lubricant thereto. Moreover, the material of resin bush 76, 77 may also be replaced with a non-metallic material and elastomer within the range for satisfying the removing load and temporary holding function.

In this embodiment, it is enough that the internal diameter size $\phi V$ of the U-shape in the body forward side of cut-away groove 6, 61 (FIG. 4, FIG. 9, FIG. 10, FIG. 11, FIG. 14, FIG. 18) is equal to the external diameter size $\phi U$ of the small diameter cylinder 72 of collar 7 or is a little larger than the external diameter size $\phi U$. Moreover, it is also enough that the width W of the cut-away groove 6, 61 is equal to the internal diameter size $\phi V$ of the U-shape in the body forward side of cut-away groove 6, 61 or is a little smaller than the internal diameter size $\phi V$ of the U-shape.

What is claimed is:

1. A steering column device, comprising:
   a steering shaft for a steering wheel being attached at an end, a column body for rotatably supporting said steering shaft, a bracket of said column body having mounting flanges each with a cut-away groove opening in the backward direction of a car body, a collar having a flange part with an outer diameter larger than the width of said cut-away groove and a cylindrical part with an outer diameter smaller than the width of said cut-away groove, an elastically deformable ring with an outer diameter larger than the width of said cut-away groove and an inner diameter which said cylindrical part of said collar can be inserted in, a bolt for compressing said ring, putting said mounting flange of said column body between said ring and said flange part, so that said column body is mounted on said car body but allowed to be detached from said car body in a secondary collision, and a cylindrical bush being inserted between said cylindrical part of said collar and said cut-away groove.

2. A steering column device according to claim 1, wherein said ring is bent so that the outer edge of said ring is opposite to said mounting flange.

3. A steering column device according to claim 1, wherein said collar is made of electro-conductive material.

4. A steering column device according to claim 1,
wherein said bush has a bush flange with an outer diameter larger than the inner diameter of said ring and a through-hole for said cylindrical part to be forced into.

5. A steering column device according to claim 1,
wherein said bush has an extension part with a contact surface extending over said ring and projecting toward the car body.

6. A steering column device according to claim 5, wherein said extension part is extending in the backward direction of the car body.

7. A steering column device according to claim 5, wherein an amount of projection of said extension part is larger than the thickness of said ring.

8. A yieldable mounting device for a car, comprising:
a member to be mounted having a mounting flange with a cut-away groove opening in the backward direction of a car body, a collar having a flange part with an outer diameter larger than the width of said cut-away groove and a cylindrical part with outer diameter smaller than the width of said cut-away groove, an elastically deformable ring with an outer diameter larger than the width of said cut-away groove and an inner diameter which said cylindrical part of said collar can be inserted in, a bolt for compressing said ring, putting said mounting flange of said member between said ring and said flange part, so that said member is mounted on said car body but allowed to be detached from said car body in a secondary collision, and a cylindrical bush being inserted between said cylindrical part of said collar and said cut-away groove.

9. A steering column device, comprising:

a steering shaft for a steering wheel being attached at an end, a column body for rotatably supporting said steering shaft, a bracket of said column body having mounting flanges each with a cut-away groove opening in the backward direction of a car body, a collar having a flange part with an outer diameter larger than the width of said cut-away groove and a cylindrical part with an outer diameter smaller than the width of said cut-away groove, an elastically deformable ring with an outer diameter larger than the width of said cut-away groove and an inner diameter which said cylindrical part of said collar can be inserted in, a bolt for compressing said ring, putting said mounting flange of said column body between said ring and said flange part, so that said column body is mounted on said car body but allowed to be detached from said car body in a secondary collision, and said ring is provided with a plurality of slits extending in the radial directions.

10. A steering column device, comprising:

a steering shaft for a steering wheel being attached at an end, a column body for rotatably supporting said steering shaft, a bracket of said column body having mounting flanges each with a cut-away groove opening in the backward direction of a car body, a collar having a flange part with an outer diameter larger than the width of said cut-away groove and a cylindrical part with an outer diameter smaller than the width of said cut-away groove, an elastically deformable ring with an outer diameter larger than the width of said cut-away groove and an inner diameter which said cylindrical part of said collar can be inserted in, a bolt for compressing said ring, putting said mounting flange of said column body between said ring and said flange part, so that said column body is mounted on said car body but allowed to be detached from said car body in a secondary collision, and said ring has a plurality of pawls extending inwardly from an inner circumference of said ring and engaging with said cylindrical part when said cylindrical part is inserted into said ring to couple said ring and said collar.

* * * * *